May 3, 1960     R. F. GRUNWALD ET AL     2,934,949
TESTING DEVICE FOR FILM

Filed Aug. 18, 1958     3 Sheets-Sheet 1

Inventors
Robert F. Grunwald
Richard R. Wallace
Howard Bowen
By Frost & Vandenburgh
Attorneys

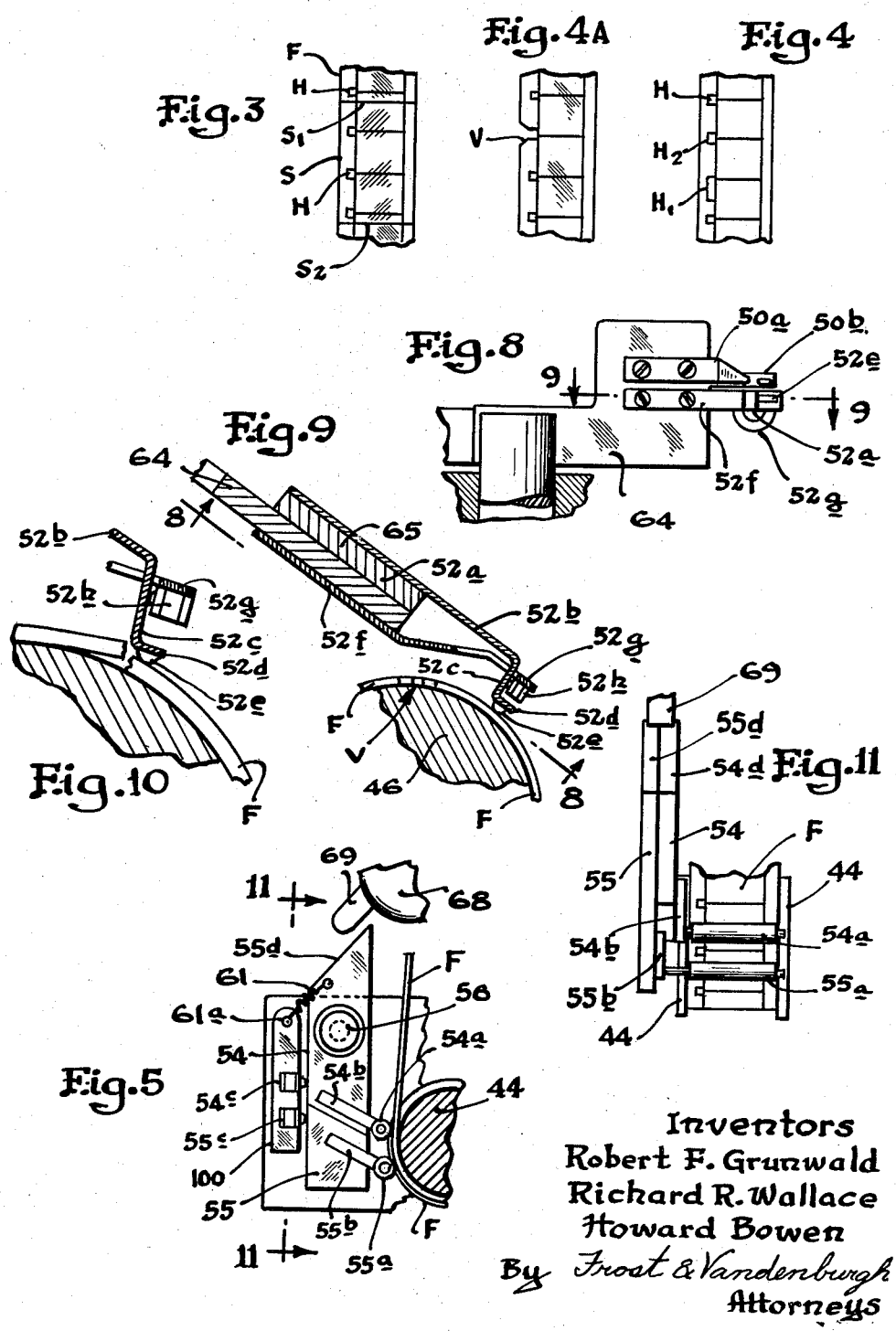

May 3, 1960
R. F. GRUNWALD ET AL
2,934,949
TESTING DEVICE FOR FILM
Filed Aug. 18, 1958
3 Sheets-Sheet 3
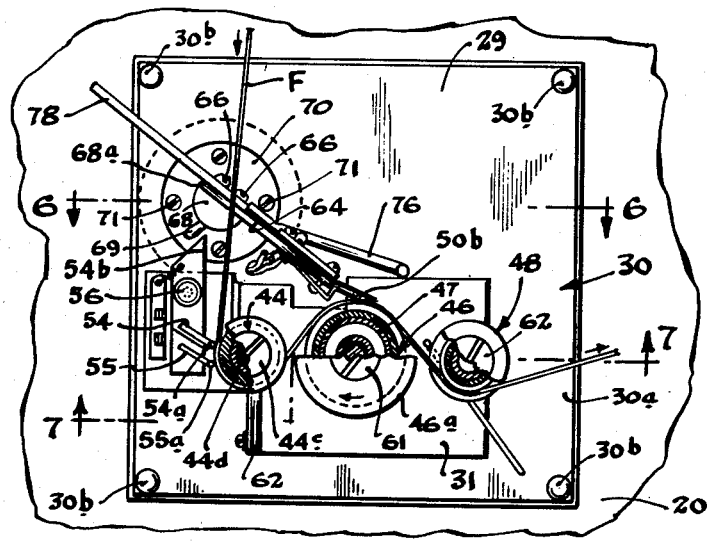
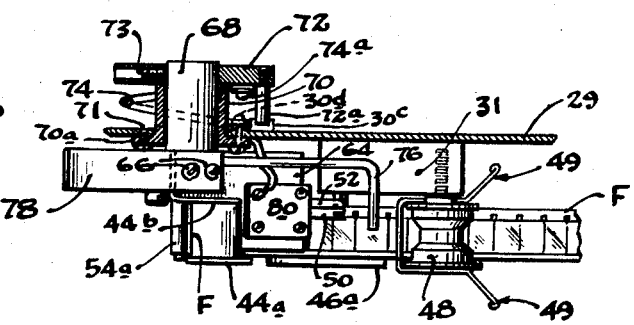
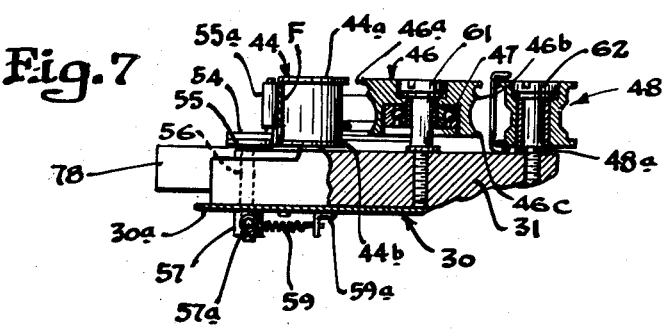
Inventors
Robert F. Grunwald
Richard R. Wallace
Howard Bowen
By Frost & Vandenburgh
Attorneys United States Patent Office 2,934,949
Patented May 3, 1960

2,934,949

TESTING DEVICE FOR FILM

Robert F. Grunwald, Northbrook, Richard R. Wallace, Wilmette, and Howard Bowen, Evanston, Ill., assignors to The Harwald Company, Inc., Chicago, Ill., a corporation of Illinois Application August 18, 1958, Serial No. 755,615

9 Claims. (Cl. 73—157)

Our invention relates to improvements on the device for testing film shown in Robert Grunwald and Donald K. White Patent 2,699,676, issued on January 18, 1955.

In the testing of motion picture film by machines of the type shown in the above mentioned patent, some difficulties have been encountered with film having V-shaped notches deliberately cut out from the sprocket as a corrective measure for lateral sprocket hole tear. Such V-shaped notches (unlike unaltered lateral sprocket tear) do not necessarily interfere with film projection and for this reason are sometimes tolerated by film users in an effort to obtain maximum life from the film. However, the device of the above patent does not distinguish between notches of this kind and lateral sprocket hole tear of a kind that not only interferes with film projection but in addition is a film defect of the kind that will become worse unless promptly corrected. In accordance with the present invention, we have provided an improved detector mechanism in which a feeler riding on the film outboard the sprocket track catches on the upstanding edge of an objectionable lateral sprocket tear as the film bends around the roller. At the same time the mechanism of the present invention passes the edge of a proper V-shaped cut-out, as such edge conforms to the roller curvature and thus does not stand up from the remainder of the film surface.

The present invention further relates to a highly simple mechanism for sensing a splice of excessive length while passing normal and harmless short splices. This mechanism includes a pair of rollers which ride against a parent roller to respond to the thicknesses of the film, at their respective locations, together with transducers operative to sense the deflection of each such roller. Such means is so arranged that it requires the essentially simultaneous movement of both rollers to produce the signal and initiate signal and/or control functions in the machine. In this fashion normal short splices are passed and objectionable long splices are sensed, all without the use of any timing mechanism.

In addition to detecting splices of undue length without time delay circuitry, the splice detecting mechanism herein described responds to splices of undue thickness but or normal length. Since these splices likewise interfere with normal film projection, the apparatus serves this additional function of detecting such splices.

In addition to the foregoing, a mechanism such as that shown in the above identified Grunwald and White patent, while highly successful, does require some adjustment to accommodate films having varying characteristics. Otherwise, with a film of more than usual thickness the detector may act as if a splice is present when it is not, or on the other hand with a film of less than usual thickness the detector may fail to detect a splice even if it is of undue length. Similarly, the sprocket hole detector and the lateral sprocket hole tear detector respond differently to films having differing thickness, resistance to bend, friction characteristics, and the like, and for this reason adjustments are sometimes required. In accordance with the present invention a self-correcting mechanism is provided to compensate for differing characteristics of the film being tested. In brief, this mechanism includes transducer elements that provide an electrical effect that varies with the change of applied pressure, either directly or through associated circuit elements. The unit accordingly does not sense film conditions that do not vary along the length of the film, and hence is immune to variations in these film characteristics. However, since the defects detected appear as sudden changes in film conditions, the mechanism is responsive to them and does respond to give the control or signalling action.

The problem of adjusting for different uniform film characteristics has become especially important recently with the introduction and increasing use of polyester base films. These films are normally substantially thinner than current cellulose acetate films and they have other differing physical characteristics. The structures of the present invention—which respond to variations in characteristics along the length of the film and not to absolute values—permit the testing of these varying types of film without machine adjustments.

It is therefore a general object of the present invention to provide an improved device for testing film which passes V-shaped sprocket holes while sensing lateral sprocket holes tears.

A further object of the present invention is to provide a device of the foregoing type in which elements are provided to respond to the extent the film edge outboard the sprocket holes stands up from the film surface as it travels about a curved surface.

It is yet another object of the present invention to provide a device of the foregoing type having built-in cam elements which serve to pass a V-shaped cut-out sprocket hole while serving to catch a lateral sprocket hole tear.

Another object of the present invention is to provide an improved film testing device which responds to splices in excess of predetermined length but does not require electrical time-delay elements.

Still another object of the present invention is to provide an improved film testing device that accommodates film of differing thicknesses without adjustments.

Still another object of the present invention is to provide an automatic film inspecting device using a pair of spaced thickness sensing rollers which coact to sense both the thickness and the length of a splice.

Yet another object of the present invention is to provide an improved film inspecting device which senses splices of normal length but of undue thickness.

Another object of the present invention is to provide an improved film testing device that senses the presence of splices and yet requires no adjustment to accommodate variations in overall film characteristics such as thickness and resistance to flexure.

Still another object of the present invention is to provide an improved film testing device that senses elongated sprocket holes, lateral sprocket hole tear, and similar defects and yet requires no adjustment to accommodate films having differing degrees of resistance to flexure, thickness, or other characteristics that are uniform along the film length.

Yet another object of the present invention is to apply electrical transducer elements to a mechanism for inspecting film and in such a fashion that the elements serve to accommodate different film characteristics such as thickness and resistance to flexure that are essentially uniform throughout those portions of the film having no defects without adjustment and yet sense defects such as defective splices, lateral sprocket hole tear, elongated sprocket holes, and other defects.

It is still another object of the present invention to provide an improved testing device for film having means operable to catch the upstanding edge of a lateral sprocket hole tear as the film binds and yet swings out of catching position to pass the tear after the sensing operation is completed.

Other objects of the present invention include the provision of an automatic film inspecting device accomplishing the above objectives which may be incorporated in a mechanism like that of the Grunwald and White Patent 2,699,676, an automatic film inspecting device that is reliable, rugged, readily serviced, and readily and inexpensively constructed, all to the end that a unit having a maximum degree of commercial acceptability shall be obtained.

The novel features which we believe to be characteristic of our invention are set forth with particularity in the appended claims. Our invention itself, however, both as to its organization and method of operation, together with further objects and advantages thereof, will best be understood by reference to the following description taken in conjunction with the accompanying drawings in which:

Figure 2 is a greatly enlarged view of the defect detector portion of the apparatus of Figure 1, with parts broken away to show their construction;

Figures 3 and 4 and 4a are plan views of a motion picture film with certain defects of the kind handled by the apparatus of the present invention;

Figure 5 is a greatly enlarged fragmentary view of the film thickness sensing portion of the apparatus of Figure 2;

Figure 6 is a cross-sectional view through axis 6—6, Figure 2, with parts broken away and omitted to show the construction more clearly;

Figure 7 is a similar cross-sectional view through axis 7—7, Figure 2 with parts broken away and omitted to show the construction more clearly.

Figure 8 is a greatly enlarged fragmentary view from the bottom and along axis 8—8, Figure 9, of the feelers and associated parts of the mechanism of Figure 2;

Figure 9 is a still further enlarged cross-sectional view through axis 9—9, Figure 8;

Figure 10 is a still further enlarged view of the portion of the apparatus shown in Figure 9 in the presence of a lateral sprocket tear at the instant it actuates the mechanism;

Figure 11 is a fragmentary cross-sectional view through axis 11—11, Figure 5;

The film inspecting mechanism generally

Figure 1:
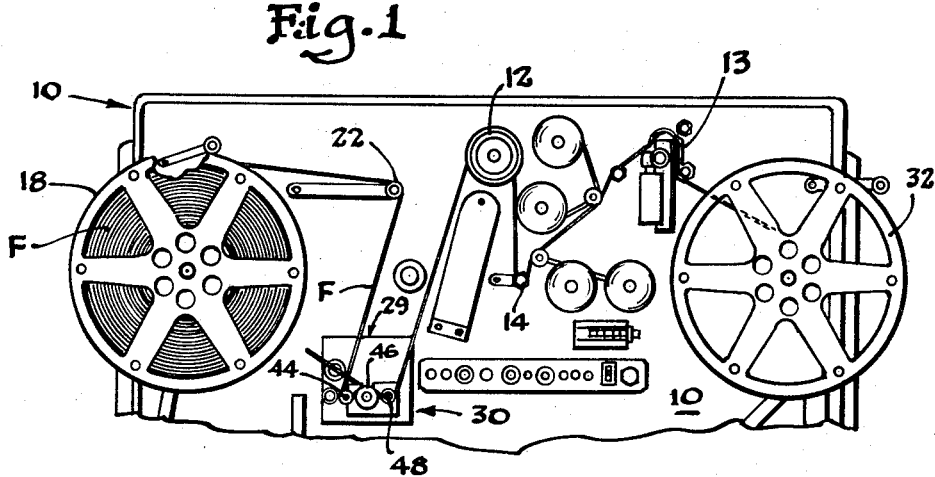
Figure 1 is a front elevational view of one form of film inspecting device constructed in accordance with the present invention, the detector portion of the unit being shown schematically.

Referring now to Figure 1, there is shown a vertical panel 10 which carries the pay-out reel 18 containing motion picture film F to be inspected and the take-up reel 32 upon which the inspected film is wound. Intermediate these reels the film passes over the guide and snubber roller 22 and then in a generally downward direction to the defect detector generally 30. This detector is shown in greater detail in Figure 2. Upon leaving the detector 30, the film travels in a generally upward direction to the drive capstan 12 and roller 14, and then to the footage counter generally 13, after which the film travels to the take-up spool or reel 32. Suitable drive mechanism (not shown) is provided to transport film F to take-up reel 32.

The present invention is directed to improvements in the defect detector 30 which is shown in detail in Figure 2. This detector includes a sub-panel 29 which carries the spaced rollers 44, 46, and 48. As shown, the film F passes underneath the roller 44 and over roller 46 and under roller 48. As hereinafter described, the roller 46 serves to support the film for sprocket hole defect detection, and the roller 48 serves to guide the film as it leaves the detector mechanism. The roller 44 coacts with the sensing rollers 54a and 55a to detect defective splices and sprocket punch.

The construction of the roller 46 is shown in Figures 2 and 7. This roller has an outboard flange 46a which aids in positioning the film. The surface of roller 46 is of hour-glass shape to support the film F along the opposite points 46b and 46c, Figure 7. Edge 46c is located along the edge opposite flange 46a just inboard the sprocket hole track of the film, as can be seen from the position of the film F, Figure 7. The roller 46 is mounted on the block 31 by the screw 61 which is threadedly received by block 31 as shown in Figure 7. The screw receives the inner race of the ball bearing 47, the outer race of which is tightly received by the roller 46.

As shown in Figures 2 and 7, the guide roller 48 is rotatably secured to the block 31 by the screw 62 which is threadedly received in block 31 with a bearing 48a being interposed between the roller and the screw. Block 31 is attached to sub-panel 29.

The feelers 50 and 52 are mounted on the insulating arm 64, Figures 2, 6 and 8. This arm is held by screws 66 to the flat face 68a of the stub shaft 68. As seen in Figure 6, this shaft is in turn rotatably supported on the panel 29 by the sleeve 70 which has a support flange 70a secured to panel 29 by the screws 71.

The splice detector

As described in detail hereafter, the film thickness or splice detecting mechanism consists of a pair of arms 54 and 55. These are shown in detail in Figures 5 and 11. Each of these arms carries a small idler or sensing roller, 54a and 55a, respectively. As shown in the figures these bear against the film F at closely spaced points of about one frame apart, this being the minimum length of a splice that can be expected to interfere with film projection.

Each of the rollers 54a and 55a is carried by an arm 54b and 55b which is affixed to the respective arm 54 and 55. The arms 54 and 55 are mounted on pin 56, are each independently rotatable with respect to the pin, and are biased in the counterclockwise direction of Figure 5 by the spring 59, Figure 7 and 61, Figure 5, respectively. It will be noted that in each instance, these springs urge the arms, and hence the rollers 54a and 55a, against the face of the film over the film-receiving roller 44. Thus, the rollers 54a and 55a and the arms 54 and 55 individually follow the outside face of the film and move back and forth as required to accommodate variations in film thicknesses under the respective rollers such as variations associated with a splice.

Movement of the arms 54 and 55, respectively, in the clockwise direction in response to variation in film thickness, serves to place pressure on the transducers 54c and 55c, respectively. These transducers may be any one of several kinds as is explained in greater detail hereafter. These transducers are mounted on a support arm 100 which is swingably mounted on the fixed support pin 61a of the spring 61. The arm 100 is biased by a suitable spring (not shown) in the counterclockwise direction to hold the transducers 54c and 55c against the respective arms 54 and 55 and at the same time to permit the arms 54 and 55 to be swung clockwise for film threading.

Figure 3 shows a section of the film F with a defective splice of the kind detected by the action of the rollers 54a and 55a in conjunction with the arms 54 and 55 and the transducers 54c and 55c. As shown, the film has a splice S, which may for example be of cellophane. Unlike a well made and acceptable splice, the splice S extends over a number of frames, in this instance almost three frames. It is defined by the edges $S_1$ and $S_2$. Frequently a splice of this kind is made without even punching the sprocket holes H, in which event the splice is virtually certain to prevent successful projection of the film. Even if the sprocket holes H are punched out—or the splice does not cover them—a long splice of this kind is not likely to be successfully passed through the gate mechanism of the projector. For these reasons it is necessary to detect splices of this kind and to correct them before attempting to project the film.

Figure 14:
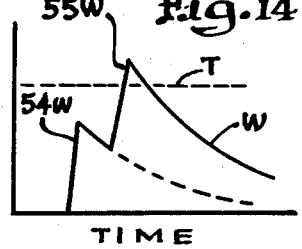

Figure 14 shows the signal voltage wave W produced by the action of the rollers 54a and 55a and the transducers 54c and 55c. The circuitry by which this wave is generated is described in more detail hereafter. It will be observed that the voltage increases in a first step 54W, at the instant the leading edge of the splice passes under roller 54a. This results from the clockwise rotation of the arm 54 in response to the splice and the deflection of the transducer 54c. A short time thereafter, when the splice reaches roller 55a, the transducer 55c is deflected to produce the voltage wave 55W. This wave takes place before the wave 54W has decayed greatly and, when added to the wave 54W, produces a voltage in excess of the signalling or control threshold value T shown in the dashed line of Figure 14.

The above description applies to a splice S of sufficient length to actuate roller 55a before roller 54a is released. If the splice does not span the distance between these rollers, the roller 54a releases arm 54 to swing counterclockwise under the bias of its restoring spring. This relieves the pressure on transducer 54c and produces a signal of reverse polarity to the signal 54W, Figure 14, and having essentially the same decay characteristic. Consequently, the subsequent actuation of roller 55a produces a signal 55W which rises from an initially reversed polarity and hence does not reach the control threshold T, Figure 14. Accordingly no control action indicative of a splice or other thickness defect of undue length takes place.

If desired, one of the transducers 54c or 55c may be connected in suitable circuitry to actuate a detecting circuit for sprocket punch such as that shown in Grunwald et al. Patent 2,699,676.

If a splice of great thinness is encountered, the two signals 54W and 55W, Figure 14, are of corresponding small values. In this event the threshold signal value T may not be reached and no splice defect will be indicated. This action is desirable in the case of certain type of film which under present practice are frequently spliced with thin but elongated splices which do not normally interfere with projection.

It sometimes occurs that a splice, while rather short, is of such thickness that it prevents satisfactory projection of the film. In this instance, the splice swings the arm 54 a very considerable distance in the clockwise direction of Figure 5 as the splice travels under the roll 54a. The transducer 54c thereupon is deflected to a very great extent. This produces a voltage wave similar to 54W, Figure 14, but which is of sufficient magnitude to reach the control threshhold T even without any action of the transducer 55c. Thus even a short splice, if of unsatisfactory thickness, is sensed by the mechanism.

The mechanism comprising the rollers 44, 54a and 55a is preferably so arranged that the rollers may be moved in relation to each other to define a gap into which the film F may be threaded. In the structure shown in Figures 2, 5, and 11, this is accomplished by the stub arm 69 which extends downwardly and to the right from the shaft 68. Shaft 68, as shown in Figure 6, extends through the block 31 and is carried therein by the sleeve 70. The latter has a flange 70a which receives the screws 71 to anchor the sleeve 70, and hence the shaft 68, in position. At its back end the shaft 68 receives the disk 72 which is secured thereon by the set screw 73. A pin 72a extends forwardly from the disk 72 and receives the outer end of the spiral spring 74 which at its inner end is anchored to the panel 31 by the screw 30d which is shown in phantom in Figure 6. The shaft 68 is thus biased in the clockwise direction as seen in Figure 2.

The shaft 68 has a flat surface 68a which receives the arm 64 and the handle 78, as shown in Figure 2. When it is desired to spread the rollers 54a and 55a in relation to the roller 44, the handle 78 is depressed. This rocks the shaft 68 in the counterclockwise direction and brings the stub arm 69 into bearing relationship with the slanting upper faces 55d and 54d of the arms 55 and 54, respectively, as seen in Figures 5 and 11. The stub arm 69 is of sufficient axial extent to span both the faces 55d and 54d as shown in Figure 11. As the movement is continued the arms 54 and 55 are moved by the engagement of the arm 69 with the faces 54d and 55d, thereby bringing the rollers 54a and 55a out of engagement with the roller 44 and providing the opening into which the film F may be conveniently threaded.

The above movement of the arms 54 and 55 is a rotational movement about the support pin 56, Figures 2 and 5. This movement also serves to swing the transducer support arm 100 about its point of swinging attachment (pin 61a) by pressure of the arms 54 and 55, respectively against the transducers 54c and 55c. As above noted, the arm 100 is biased in the counterclockwise direction of Figure 5 by suitable spring means (not shown).

*The sprocket hole defect detecting mechanism*

The sprocket hole defect detecting mechanism is shown in Figures 2, and 6 to 10. It consists of the roller 46 over which the film travels and is supported for sprocket hole defect detection, an elongated sprocket hole detection feeler 50, Figures 2 and 6, and a lateral sprocket hole tear detection feeler 52, Figures 8-10.

The feeler 50 is mounted on the bar 64 received on the flat surface 68a of the shaft 68. This bar is of insulating material, such as a phenol formaldehyde resin. The feeler 50 is clamped in position by the conducting panel 80, Figure 6, which serves as a common electrical connection for the elongated sprocket hole detection feeler 50 and the lateral sprocket hole tear detection feeler 52. As shown, the feeler 50 extends over the film F as it rests on the roller 46 and terminates in a jewel 50b which rides on the sprocket track of the film and is of sufficient length to ride over normal sprocket holes while passing into elongated sprocket holes. Thus, if a sprocket hole is elongated as at $H_1$, Figure 4, the jewel 50b rides into the sprocket hole and the feeler 50 flexes correspondingly. A fixed contact element 50a is located below the feeler 50 as shown in Figures 2 and 8 and makes contact therewith when the jewel 50b rides into an elongated sprocket hole, thereby closing the electrical circuit between elements 50a and 50 indicating the presence of such elongated sprocket hole. This mechanism is described in further detail and claimed in Grunwald and White Patent 2,699,676 and is not a part of the present invention.

The lateral sprocket tear detection feeler 52 is shown in detail in Figures 8 and 9. This feeler consists of an arm 52a having an extending portion 52b which arm is mounted on the insulating plate 64 with the block 65 situated between the feeler and the arm 64. The feeler 52 also has a portion 52c which is in generally radial orientation in relation to the roller 46. Feeler 52 terminates in a shoe portion 52d upon which the jewel 52e is mounted. The portion 52c is relatively flexible so that when the shoe 52d is pulled in the direction of the film movement (clockwise on roller 46 as seen in Figure 9), the portion 52c of the arm 52 flexes. This flexure is shown in Figure 10. It will be also observed that the portion 52b of feeler 52 is also flexible in the vertical direction and thereby accommodates up and down movements of the jewel 52e.

The feeler arm 52a coacts with the lower similar arm 52f. This feeler arm 52f is seen in Figure 8 and has an arcuate portion 52g which extends around the radial portion 52c of the arm 52a. At its outboard end and in registry with the arm 52c, the arm 52f carries a transducer 52h. This transducer is positioned to respond to pressure from arm 52c in the direction of the film movement.

Under normal film conditions, the jewel 52e rides along the portion of the film F outboard the sprocket track. At this time, the film slides easily under the jewel 52e and the pressure on the transducer 52h is of substantially constant value. However, when a lateral sprocket hole tear such as $H_2$, Figure 4, reaches jewel 52e, the portion of the film at that tear tends to stand up (radially out) in relation to the remainder of the film as shown at $H_2$, Figure 10. This upstanding portion of the film is of sufficient radial extent to engage the front face of the end of part 52c of the feeler 52a. Continued motion of the film F in the clockwise direction as seen in Figure 10 flexes the part 52c of the feeler arm 52a as is shown in Figure 10. This action subjects the transducer 52h to pressure, inasmuch as the arm 52f resists corresponding movement of the transducer 52h. This produces an electrical signal through the action of transducer 52h as hereinafter described in detail.

Continued movement of the roller 46 in the clockwise direction, and movement of the film F with the roller, ultimately flexes the portion 52c of the feeler arm 52a sufficiently to swing it radially out and over the projecting portion of the film F. The feeler arm 52a thereupon snaps back to the condition shown in Figure 9 where the transducer 52h is subjected only to the normal frictional force of the film F as it travels under the jewel 52e and no signal is produced.

A V-shaped sprocket hole cut-out is shown at V, Figure 4a. This cut-out is usually made with a V-shaped cutter or punch especially intended for this purpose. Sprocket hole cut-out of this kind does not usually prevent projection of the film, nor does it usually spread tear to destroy the film. For these reasons it is common practice to make such V-shaped cut-outs where lateral sprocket hole tear, as at $H_2$, Figure 4, has taken place. Since the user of the machine may consider V-shaped sprocket hole cut-out to be inocuous, it is desirable that the mechanism provided for detecting lateral sprocket hole tear should not respond to such V-shaped sprocket hole cut-out. The mechanism of Figures 8–10 does not respond to V-shaped sprocket hole cut-out because it wraps about the surface of the roller 46 in the same fashion as the remaining portions of the film. This is illustrated at V, Figure 9, in which such a V-shaped sprocket hole cut-out is shown over the roller 46. It will be noted that this cut-out does not produce any upstanding edge capable of engaging the portion 52c of the feeler 52a.

*The transducer mechanism*

Figure 12:
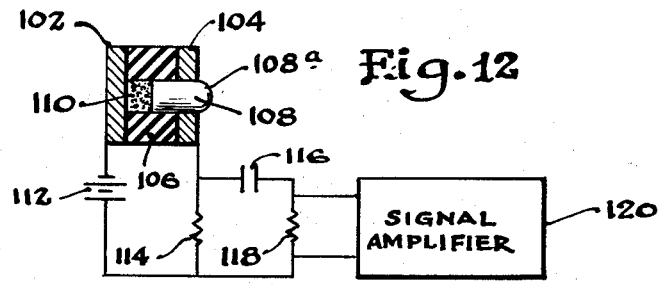
Figure 12 is a diagrammatic view in axial cross-section of one form of electrical transducer of the kind applicable to the mechanism of the present invention, together with the electrical circuit used therewith.

The transducers 54c, 55c, and 52h are all of a type capable of producing an electrical response in accordance with the pressure exerted against them. Figure 12 shows in diagrammatic fashion one type of transducer suitable for this purpose. It consists of a pair of plates 102 and 104, between which is sandwiched an insulating tube 106 which has a bore registering with a like hole in the plate 104. A conducting plunger 108 is snugly received in the hole in plate 104 and the bore in the tube 106 and is pressed towards the plate 102 in accord with the pressure exerted on the transducer. Carbon granules 110 are located in the space between the plunger 108 and the plate 102, as shown.

As is well known, the resistance across the carbon granules 110 varies in accordance with the pressure applied to them. Thus, the resistance as seen between the plates 102 and 104 varies in accordance with the pressure against the end 108a of the plunger 108, the resistance falling as this pressure is increased and increasing as this pressure is reduced. Thus the resistance between the plates 102 and 104 is a measure of the pressure on the transducer.

Since the transducer shown in Figure 12 responds to the actual pressure and does not respond to the rate of change of pressure, circuit elements are provided to produce a signal of value determined by the change of the resistance between the plates 102 and 104. This circuit consists of the battery 112, which is connected in series with resistance 114 across the plates 102 and 104. An RC circuit defined by capacitor 116 and resistance 118 is connected across resistance 114, as shown, and the signal amplifier 120 (which energizes the signalling and control circuits) is connected across the resistance 118.

When the pressure against the plunger 108 changes, the current flow from the battery 112 through the resistance 114 likewise suddenly changes. This gives rise to a substantially instantaneously changed voltage drop across resistance 114, thereby causing the capacitor 116 to charge (or discharge) through the resistance 118 at a rate determined by the time constant of the charging (or discharging) circuit. As a result a voltage appears across resistance 118 in proportion to the rate of charge (or discharge) of the capacitor 116. Thus the voltage is determined by the change of the pressure applied to the plunger 108, rather than the absolute value of the pressure.

Thus, as with the transducer 52h, the construction and circuit of Figure 12 gives rise to signal when the pressure against the transducer suddenly increases as the portion $H_2$, Figure 10, of the film strikes the arm 52c. However, at all other times, when the pressure of arm 52c against the transducer is essentially constant, no signal or control voltage is developed. It will be noted in this connection that the amount of the pressure of the arm 52c against the transducer is not important, so that it is unnecessary to readjust the mechanism to take into account the various factors tending to vary the frictional resistance of the jewel 52e to the travel of the film beneath it.

In the case of the transducers 54c and 55c it is necessary to so arrange them that they produce an actuating signal when both are under increased pressure and, in addition so that sufficient pressure against either one alone is sufficient to make such a signal. This may be accomplished by the circuit of Figure 13, which consists of two transducers like that of Figure 12 in series circuit relationship. The circuit elements in this circuit are otherwise like those of Figure 12 and are indicated by like reference numerals with 100 added. The action of the circuit is similar to that of Figure 12 in that a sudden change in the pressure upon either of the transducers 54c or 55c gives rise to a sudden change in the voltage drop across resistance 214 with the consequent charging or discharging of the capacitor 216 through the resistor 218 and production of a signal at the amplifier 220.

Figure 13:
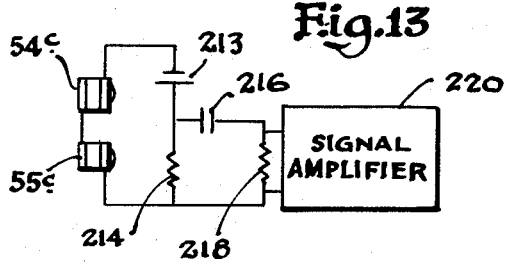
Figure 13 is an electrical circuit diagram showing the circuit for the elongated splice sensing mechanism of the present invention; and, Figure 14 is a chart showing the signal voltage generated by the apparatus of Figure 13.

Figure 14 shows the action of the circuit of Figure 13 when a splice of undue length travels over roller 44, Figure 5 and thereby actuates the rollers 54a and 55a in quick succession. The first effect is to give a sudden increase in pressure against the transducer 54c, thereby decreasing its resistance and causing the capacitor 216 to charge through the resistance 218. This produces the voltage wave 54W, Figure 14 which decays exponentially as shown and, in the absence of other events would approach zero with increasing time as shown in the dashed curve of Figure 14. However, before the voltage wave 54W has decayed to a great extent, the splice additionally actuates the roller 55a, thereby applying pressure to the transducer 55c and causing a further decrease in the resistance across battery 212 and a still further increase in current flow through the resistance 214. There is thus an increased voltage drop across resistance 214, and capacitor 216 now additionally charges through the resistance 218. This produces the voltage wave 55W, Figure 14, which adds to the decayed value of the voltage wave 54W as shown. The resultant voltage wave is sufficient to energize the amplifier 220 above its threshhold value T, thereby actuating the control and signal circuits.

If perchance a very thick splice travels under the roller 54a, the pressure against the transducer 54c may be sufficient to decrease its resistance so markedly that the current flow in resistance 214 (and resultant voltage increase) is sufficient to cause such rapid charging of the capacitor 216 through the resistance 218 that the threshold signal level T, Figure 14 is reached on the signal 54W. In this event the amplifier 220 actuates the signal and control circuits to indicate the presence of a splice defective solely because of its undue thickness.

From the foregoing it will be seen that the action of the mechanism of Figure 5, in conjunction with a transducer of the general kind illustrated in Figure 12 and in the circuit of the general kind shown in Figure 13, is to actuate the control and signal circuits upon the incidence of a splice of normal thickness but of undue length, or in the alternative a splice of normal length but of undue thickness. However, with a splice of normal thickness and normal length the transducer 54c passes the splice before the splice reaches transducer 55c. When transducer 54c passes the splice, a reversed voltage wave in form like 54w, Figure 14, is produced. The subsequent voltage wave produced by actuation of transducer 55c does not produce a net signal reaching the threshold T because of the reversed voltage wave 54w. The signal or control mechanism is accordingly not actuated.

If desired, the transducers 54c and 55c may be replaced by pairs of contact elements that close upon predetermined clockwise movements of the arms 54 and 55, respectively. Such contacts serve to sense only the fact of such predetermined movement and do not have the ability to compensate for differences in average film thickness, nor can they in the absence of additional means detect the presence of a splice of undue thickness but of acceptable length. With such pairs of contact elements, they are placed in series connection across the signal or control mechanism to actuate that mechanism upon simultaneous closure of the two pairs of contacts. Thus, they actuate the signal or control mechanism upon the occurrence of a splice of undue length without the use of electrical or other timing mechanism. As hereinbefore explained this is of substantially less value to the user because of the effects thin film, speed of operation, etcetera which will change the operation or the results obtained.

In the foregoing description the functions effected by the sensing of unduly long splices, splices of undue thickness, elongated sprocket holes, lateral sprocket tear, and other defects are broadly referred to as signalling and control functions. It will, of course, be obvious that these functions may be of many different kinds. For example, the mechanism may be arranged so that an audible or visual signal is made. Alternatively (and most usually) the machine may be stopped in the event of a detected defect. Still another mode of signalling is that of actuating a counter which thereupon indicates the number of such defects in the film. All of these and other functions are possible. It is also possible to arrange the machine so that some types of defects stop the machine, other types of defects give a signal, and still other types are counted. All of these variations are mere alternatives that may be chosen by the designer or user, using the mechanism herein described to detect the fact of the defect in question.

While we have shown and described a carbon granule type transducer, it will of course be understood that any one of the other well known forms of transducers may also be used. For example, a capacitance type transducer or other transducer measuring only physical position may be used. In such forms of transducers, the differentiating circuit elements similar to those of Figures 12 and 13 are necessary to create a signal response to the changes in pressure as described in connection with Figure 14. Alternatively, a moving magnet type transducer, variable reluctance transducer, moving coil transducer, or other form of transducer that itself performs the necessary differentiating function to produce signals such as shown in Figure 14, may be used. In such instance the output of the transducer may feed the signal amplifier without any modifying network.

In addition, while we have shown and described the feeler mechanism 50a—50b, Figure 2 as a contact type mechanism, a continuously variable type transducer, such as that of Figure 12 may be used. When coupled with suitable differentiating circuitry (such as that of Figure 12), such feeler will then be immune to changes in the average resistance of the film to flexure, thereby avoiding the need to adjust the equipment to compensate for such film variation.

While we have herein referred to motion picture film, it will be understood that this invention is applicable to strip film intended for the display of a succession of still pictures, as well as tapes of similar construction for non-visual recordings.

While we have shown and described particular forms of the present invention it will be understood that many modifications and alternative constructions may be made without departing from the true spirit and scope of our invention. We therefore intend by the appended claims to cover all such modifications and alternative constructions as fall within their true spirit and scope.

What we claim as new and desired to secure by Letters Patent of the United States is:

1. A motion picture film inspecting device capable of responding to splices in excess of predetermined length and to splices in excess of predetermined thickness, comprising in combination: means defining a surface over which the film may travel; means to draw the film over said surface; a pair of rollers spaced by substantially said predetermined length and bearing against the film on said surface, respectively, said rollers being mounted for independent movement away from said surface in response to the presence of a film splice; signal means operable in response to a signal in excess of predetermined magnitude; transducers responsive to the movements of said rollers, respectively, and circuit means connecting said transducers to said signal means in additive relationship, whereby the signal means is operated in response to a splice in excess of a predetermined length but of normal thickness and to splices of normal length but of in excess of predetermined thickness.

2. A motion picture film inspecting device capable of responding to splices in excess of predetermined length, comprising in combination: means defining a surface over which the film may travel; means to draw the film over said surface; a pair of rollers spaced by substantially said predetermined length and bearing against film on said surface, respectively, each of said rollers being mounted for independent movement away from said surface in response to the presence of a film splice or other thick discontinuity; and means responsive to the essentially simultaneous movement of said rollers away from said surface to detect the presence of a splice or other thickness defect in excess of said predetermined length.

3. A motion picture film inspecting device capable of responding to splices in excess of predetermined length and to splices in excess of predetermined thickness, comprising in combination: a main roller adapted to receive the film and support the same; means to draw film over said main roller; a pair of feeler rollers bearing against film on the surface of the main roller, respectively; arms supporting said feeler rollers, respectively, and permitting independent movements of the same in relation to the main roller in response to the film thickness; signal means operable in response to a signal in excess of predetermined magnitude; transducers responsive to the movements of said arms, respectively; and circuit means connecting said transducers to said signal means in additive relationship, whereby the signal means is operated in response to a splice in excess of a predetermined length but of normal thickness and to splices of normal length but in excess of predetermined thickness.

4. A motion picture film inspecting device capable of responding to splices in excess of predetermined length, comprising in combination: first sensing means operable to produce an electrical condition in accordance with the thickness of the film at a first predetermined point in space; second sensing means operable to produce an electrical condition in accordance with the thickness of the film at a second predetermined point spaced from the first point by said predetermined length; means responsive to said first two means operable to produce a voltage in accord with the additive value of said electrical conditions; circuit means including a capacitor and a resistor in series relationship across said voltage, said means defining a capacitor discharge path of predetermined time constant; and means to move the film between the first sensing means and the second sensing means in a time interval that is short in relation to said time constant, whereby a splice of sufficient length to span the sensing means produces two successive voltage pulses across the resistance, the second voltage pulse occurring before the first has substantially decayed.

5. A motion picture film inspecting device capable of responding to film thickness discontinuities such as splices longer than a predetermined length or thicker than predetermined thickness, comprising in combination: means defining a surface over which the film may travel; means to draw the film over said surface; a pair of feeling devices spaced by substantially said predetermined length and bearing against the film on said surface, respectively, each of said devices being mounted for movement in direction generally normal to said surface in response to a thickness discontinuity; transducers responsive to the movements of said rollers respectively; signal means; and circuit means connecting said transducers to said signal means in such a relationship that said signal means operates in response to the substantially simultaneous occurrence of signals from both transducers as a thickness discontinuity spans the space between the feeling devices or from the transducers singly as a result of thickness discontinuities in excess of a predetermined amount regardless of length.

6. A motion picture film inspecting device capable of responding to splices having thickness in excess of predetermined thickness and in excess of predetermined length, comprising in combination: means defining a surface over which the film may travel; means to draw the film over said surface; a pair of thickness feelers spaced along said surface by substantially said predetermined length, each of said feelers being spaced from said surface a distance less than said predetermined thickness, each of said feelers being mounted for independent movement away from said surface whereby said predetermined thickness passing under each feeler will cause said feeler to move away from said surface; and means responsive to the essentially concurrent displacement of said feelers away from said surface to detect the presence of a splice or other thickness defect in excess of said predetermined thickness and length.

7. A motion picture film inspecting device capable of responding to splices in excess of predetermined length and in excess of predetermined thickness, comprising in combination: a main roller adapted to receive the film and support the same; said roller defining a surface from which measurements of film thickness may be made; means to draw film over said roller; a pair of thickness feelers spaced along said surface by substantially said predetermined length, each of said feelers being spaced from said surface a distance less than said predetermined thickness of a splice of film, each of said feelers being mounted for independent movement away from said surface whereby said predetermined thickness passing under each feeler will cause said feeler to move away from said surface; and means responsive to the essentially concurrent displacement of said feelers away from said surface to detect the presence of a splice or other thickness defect in excess of said predetermined length.

8. A motion picture film inspecting device capable of responding to splices in excess of predetermined length and to splices in excess of predetermined thickness, comprising in combination: means defining a surface over which the film may travel; means to draw the film over said surface; a pair of thickness feelers spaced along said surface by substantially said predetermined length, each of said feelers being spaced from said surface a distance less than said predetermined thickness of a splice, each of said feelers being mounted for independent movement away from said surface whereby said predetermined thickness passing under each feeler will cause said feeler to move away from said surface; transducers responsive to the movements of said feelers away from said surface, respectively; signal means connected to said transducers in additive relationship and responsive to an electrical signal from said transducers in excess of a predetermined magnitude, whereby the signal means is operated in response to a splice in excess of a predetermined length and of said predetermined thickness and to splices of less than said predetermined length but in excess of said predetermined thickness.

9. A motion picture film inspecting device capable of responding to a lateral tear while passing V-shaped sprocket hole cutout, comprising in combination: means to move the film along a path in a given direction; a film receiving roller having a portion thereof in said path to define an arcuate path about said portion about which arcuate path said film in the region of lateral tear will stand up in relation to the remainder of the film; a feeler positioned at a side of said film adjacent the edge of the film and at a point in the arcuate path about said roller; mounting means for said feeler, said mounting means including a rigid support, an arm fixed at one of its ends to said support, said arm having a first portion extending from said support along a line generally parallel to a tangent to said roller at said point, said arm having a second, resilient, portion generally normal to said tangent and connecting said first portion of said arm and said feeler, whereby an upstanding part of said film will flex said arm in said direction and thereafter will pass between said roller and said feeler; and signalling means having a member responsive to the flexure of said arm to signify the presence of a lateral tear in said film.

References Cited in the file of this patent

UNITED STATES PATENTS

| | | |
|---|---|---|
| 2,469,608 | Phillimore | May 10, 1949 |
| 2,674,127 | Garrett et al. | Apr. 6, 1954 |
| 2,699,676 | Grunwald et al. | Jan. 18, 1955 |